US012615593B2

(12) United States Patent
Zhou et al.

(10) Patent No.: US 12,615,593 B2
(45) Date of Patent: Apr. 28, 2026

(54) METHOD FOR CONTROLLING PDCCH MONITORING, MEDIUM, AND ELECTRONIC DEVICE

(71) Applicant: SPREADTRUM COMMUNICATIONS (SHANGHAI) CO., LTD., Shanghai (CN)

(72) Inventors: Huayu Zhou, Shanghai (CN); Zhengang Pan, Shanghai (CN); Zhenzhu Lei, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 846 days.

(21) Appl. No.: 17/794,450

(22) PCT Filed: Feb. 7, 2021

(86) PCT No.: PCT/CN2021/075843
§ 371 (c)(1),
(2) Date: Jul. 27, 2022

(87) PCT Pub. No.: WO2021/148048
PCT Pub. Date: Jul. 29, 2021

(65) Prior Publication Data
US 2023/0073156 A1      Mar. 9, 2023

(30) Foreign Application Priority Data

Jan. 21, 2020     (CN) ......................... 202010072627.3

(51) Int. Cl.
| | |
|---|---|
| *H04W 52/02* | (2009.01) |
| *H04L 5/00* | (2006.01) |
| *H04W 76/28* | (2018.01) |

(52) U.S. Cl.
CPC ....... *H04W 52/0229* (2013.01); *H04L 5/0053* (2013.01); *H04W 76/28* (2018.02)

(58) Field of Classification Search
CPC . H04W 52/0229; H04W 76/28; H04W 76/15; H04W 52/0248; H04L 5/0053; H04L 5/0098; Y02D 30/70
See application file for complete search history.

(56) References Cited

U.S. PATENT DOCUMENTS

| | | | |
|---|---|---|---|
| 2016/0270146 A1 | 9/2016 | Feuersaenger et al. | |
| 2017/0202055 A1 | 7/2017 | Feuersaenger et al. | |
| 2019/0124558 A1 | 4/2019 | Ang et al. | |
| 2019/0254110 A1* | 8/2019 | He ......................... | H04W 76/28 |
| 2020/0092814 A1* | 3/2020 | Zhou ................. | H04W 52/0235 |
| 2021/0029772 A1* | 1/2021 | Islam .................... | H04L 1/1896 |

(Continued)

FOREIGN PATENT DOCUMENTS

| | | |
|---|---|---|
| CN | 102932950 A | 2/2013 |
| CN | 103327537 A | 9/2013 |

(Continued)

OTHER PUBLICATIONS

Ericsson. Reduced latency Scell management for NR CA, 3GPP TSG-RAN WG1 #98bis, R1-1911015, Oct. 4, 2019.

(Continued)

*Primary Examiner* — Edan Orgad
*Assistant Examiner* — Malick A Sohrab
(74) *Attorney, Agent, or Firm* — HAUPTMAN HAM, LLP

(57) ABSTRACT

A method for controlling PDCCH monitoring is provided in the disclosure. The method may include: obtaining first signaling; and determining whether a secondary cell is in a dormant state or a non-dormant state according to the first signaling.

16 Claims, 6 Drawing Sheets

(56)                References Cited

U.S. PATENT DOCUMENTS

2021/0360528 A1 *  11/2021  Cai ....................... H04L 5/0053
2021/0368368 A1 *  11/2021  He .......................... H04L 5/001
2021/0377852 A1 *  12/2021  Zhou ................ H04W 52/0235
2022/0141904 A1 *   5/2022  Yilmaz ................. H04W 76/27
                                                        370/329
2022/0201522 A1 *   6/2022  Tao ....................... H04W 24/08
2022/0210866 A1 *   6/2022  He ........................ H04L 5/0048
2022/0330156 A1 *  10/2022  Zhou ................ H04W 52/0206
2023/0164792 A1 *   5/2023  Cheng .................. H04W 72/23
                                                        370/329

FOREIGN PATENT DOCUMENTS

CN        104363978  A      2/2015
CN        105991212  A     10/2016
CN        106604376  A      4/2017
CN        107770795  A      3/2018
CN        110199550  A      9/2019
CN        111277399  A      6/2020

OTHER PUBLICATIONS

Huawei,Hisilicon."PDCCH-based Power Saving Signal/Channel" 3GPP TSG-RAN WG1 #98bis, R1-1910076, Oct. 3, 2019.
WIPO, International Search Report and Written Opinion for International Application No. PCT/CN2021/075843, Apr. 27, 2021.
Yongshuai Feng, Research and Implementation of Physical Downlink Control Channel in LTE-A Monitoring System, dated Apr. 5, 2017.
The first office action issued in corresponding CN application No. 202010072627.3 dated Mar. 9, 2022.

* cited by examiner

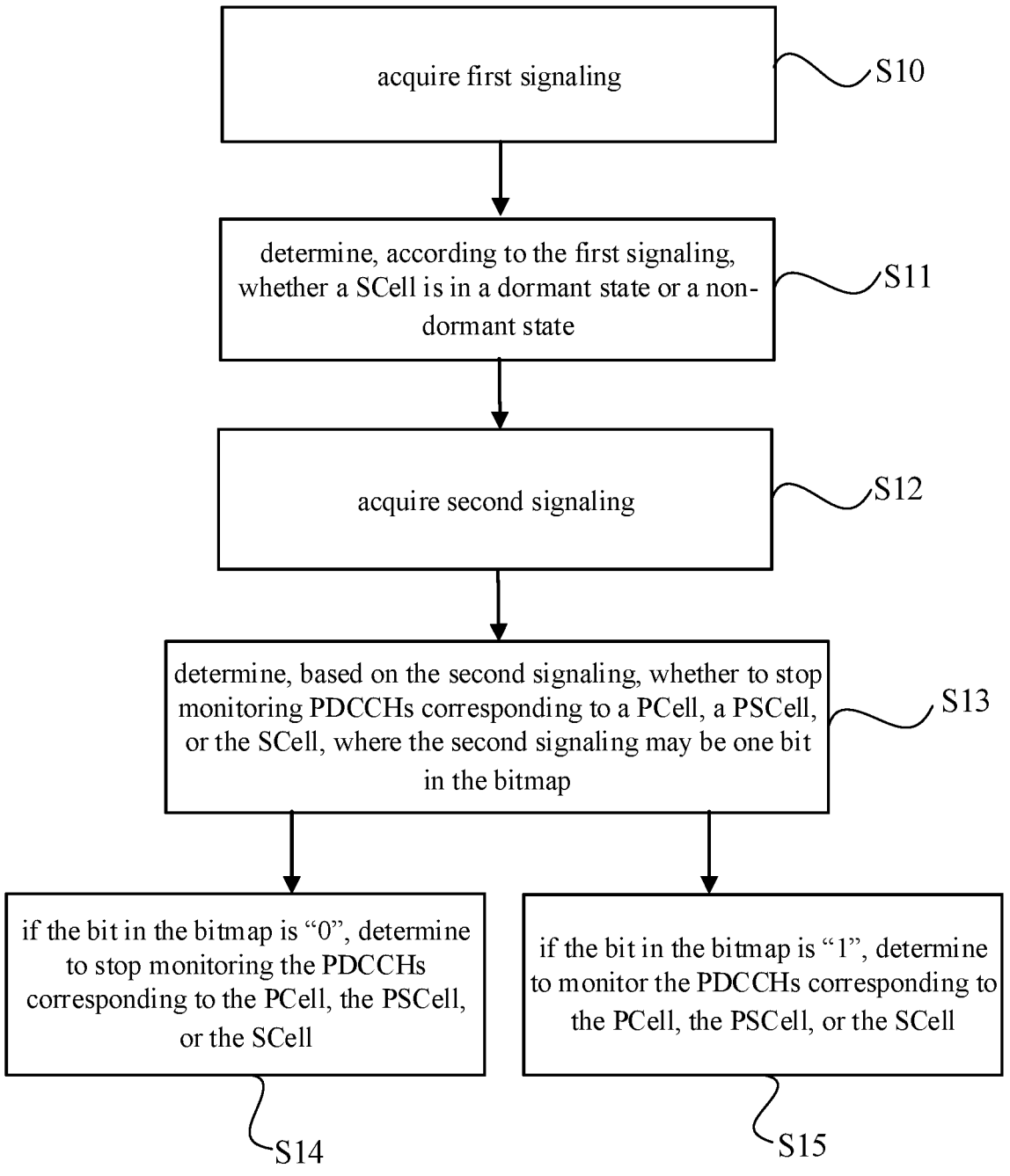

acquire first signaling                                                                ⟋S10 determine, according to the first signaling, whether a SCell is in a dormant state or a non-dormant state                                    ⟋S11 acquire second signaling                                                            ⟋S12 determine, based on the second signaling, whether to stop monitoring PDCCHs corresponding to a PCell, a PSCell, or the SCell, where the second signaling may be one bit in the bitmap                                          ⟋S13 if the bit in the bitmap is "0", determine to stop monitoring the PDCCHs corresponding to the PCell, the PSCell, or the SCell if the bit in the bitmap is "1", determine to monitor the PDCCHs corresponding to the PCell, the PSCell, or the SCell

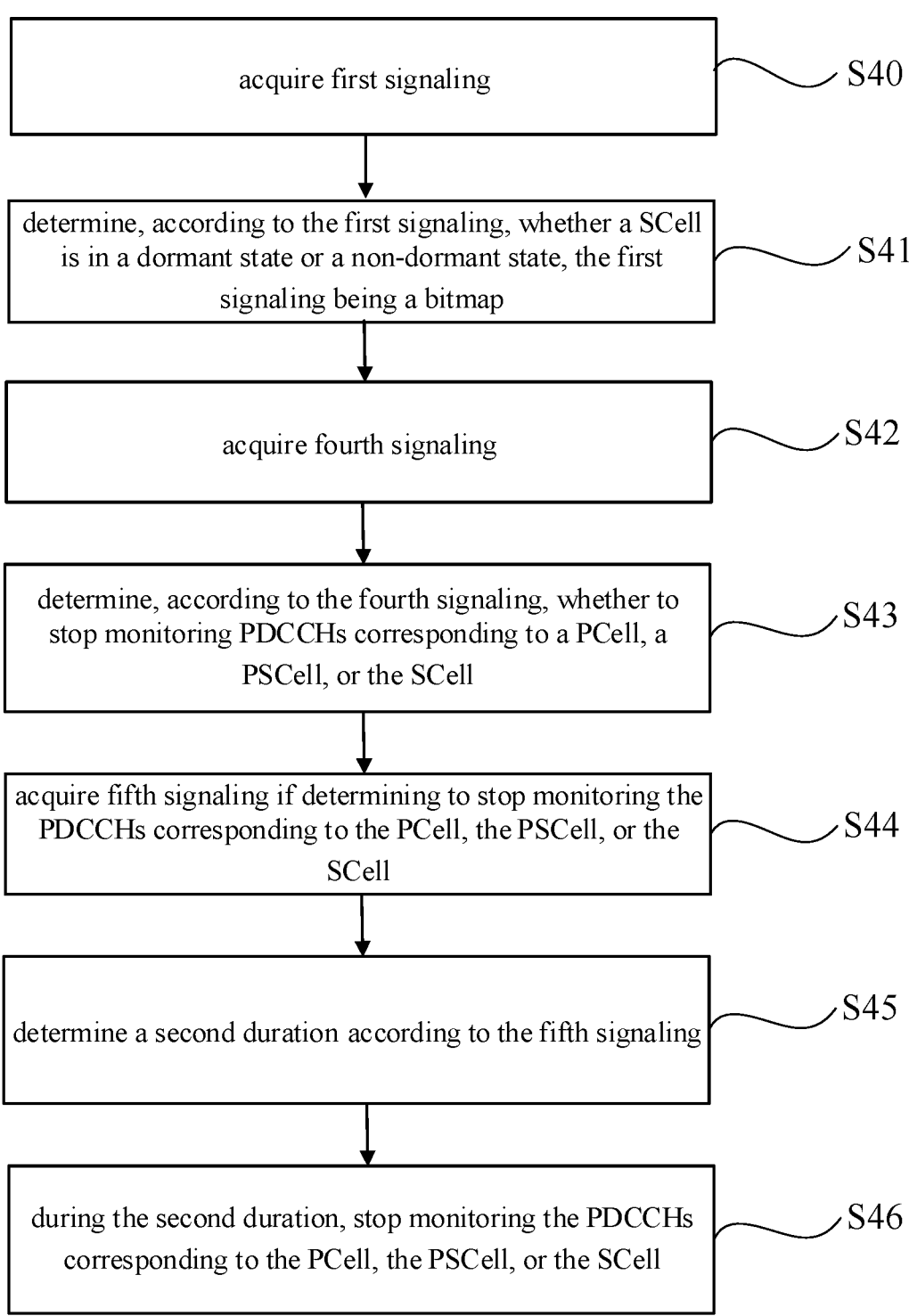

acquire first signaling — S40 determine, according to the first signaling, whether a SCell is in a dormant state or a non-dormant state, the first signaling being a bitmap — S41 acquire fourth signaling — S42 determine, according to the fourth signaling, whether to stop monitoring PDCCHs corresponding to a PCell, a PSCell, or the SCell — S43 acquire fifth signaling if determining to stop monitoring the PDCCHs corresponding to the PCell, the PSCell, or the SCell — S44 determine a second duration according to the fifth signaling — S45 during the second duration, stop monitoring the PDCCHs corresponding to the PCell, the PSCell, or the SCell — S46

FIG. 4

41    FIRST SIGNALING ACQUIRING MODULE

42    MONITORING MODULE

43    FOURTH SIGNALING ACQUIRING MODULE

44    FIFTH SIGNALING ACQUIRING MODULE

45    SECOND DURATION DETERMINING MODULE

4     CONTROL SYSTEM

53

531    RAM

533    ROM

51     PROCESSOR

532    CACHE MEMORY

534    PROGRAM MODULE

535    PROGRAM UTILITY

MEMORY

52

54     I/O INTERFACE

55     NETWORK ADAPTER

5      ELECTRONIC DEVICE

6      EXTERNAL DEVICE

METHOD FOR CONTROLLING PDCCH MONITORING, MEDIUM, AND ELECTRONIC DEVICE

CROSS-REFERENCE TO RELATED APPLICATION(S)

This application is a National Stage of International Application No. PCT/CN2021/075843, filed Feb. 7, 2021, which claims priority to Chinese Patent Application No. 202010072627.3, filed Jan. 21, 2020, the entire disclosure of which is hereby incorporated by reference.

TECHNICAL FIELD

This disclosure relates to the field of communication technology, and in particular to a method for controlling PDCCH monitoring, a medium, and an electronic device.

BACKGROUND

In Release 16 (R16) of the 5th generation (5G) mobile communication technology, a secondary cell (SCell) dormancy mechanism is introduced.

SUMMARY

In a first aspect, a method for controlling physical downlink control channel (PDCCH) monitoring includes: acquiring first signaling; and determining whether a secondary cell (SCell) is in a dormant state or a non-dormant state according to the first signaling.

In a second aspect, an electronic device includes a memory, a processor, and a computer program stored in the memory and executable on the processor, the processor is configured to execute the computer program to implement the method for controlling PDCCH monitoring described above.

In a third aspect, a non-transitory computer-readable storage medium storing a computer program which, when executed by a processor, causes the processor to implement the method for controlling PDCCH monitoring described above.

BRIEF DESCRIPTION OF THE DRAWINGS

FIG. 1 is a flowchart of a method for controlling PDCCH monitoring in embodiments of the disclosure.

FIG. 4 is a flowchart of a method for controlling PDCCH monitoring in embodiments of the disclosure.

DETAILED DESCRIPTION

Figure 2:
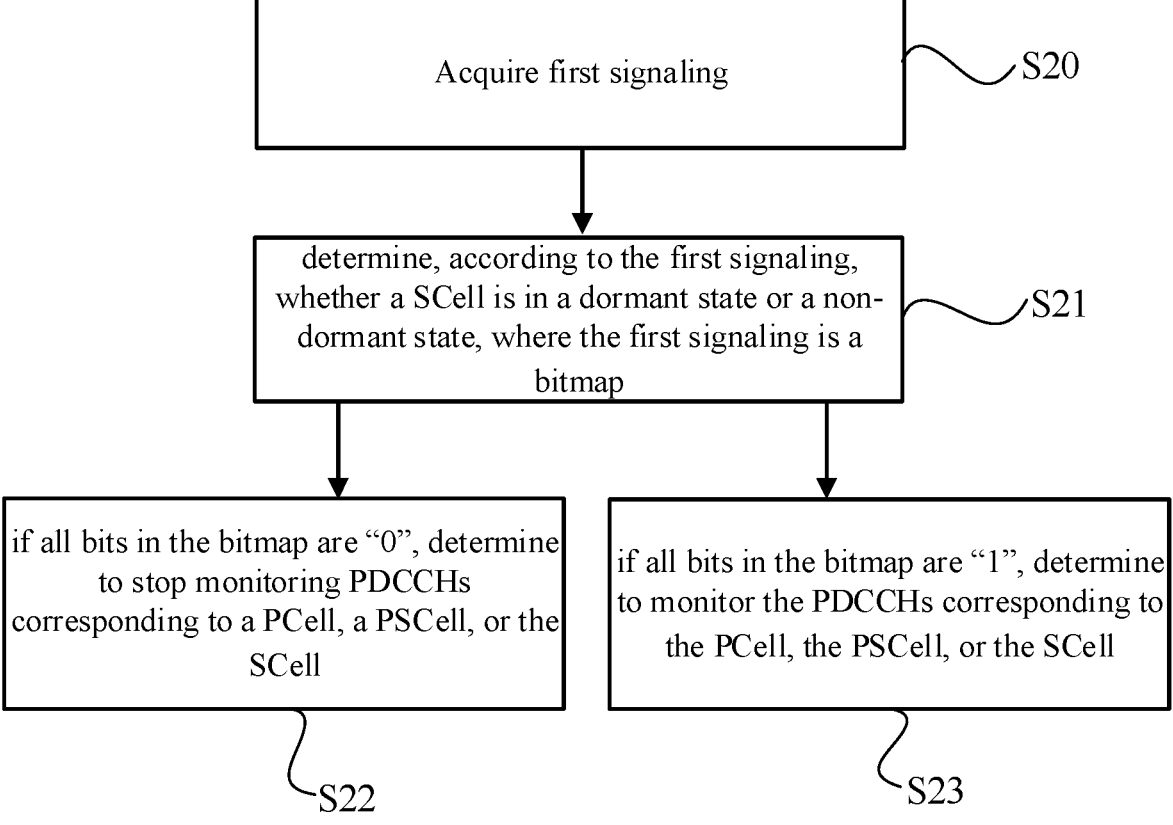
FIG. 2 is a flowchart of a method for controlling PDCCH monitoring in embodiments of the disclosure.

The present disclosure is further described below by way of embodiments, but the present disclosure is not limited to the scope of the described embodiments.

It should be noted that a method for controlling physical downlink control channel (PDCCH) monitoring provided by the embodiments of the present disclosure may be carried out by a separate chip, a chip module, or a user equipment (UE), or by a chip or a chip module integrated in the UE.

A system for controlling PDCCH monitoring described with respect to embodiments of the disclosure may be specifically a separate chip, a chip module, or a UE, or may be a chip or a chip module integrated in the UE. Various modules/units included in the system for controlling PDCCH monitoring may be software modules/units or hardware modules/units, or may be partly software modules/units and partly hardware modules/units. For example, for each device or product applied to or integrated in a chip, each module/unit included therein may be implemented by hardware such as circuits, or at least some modules/units may be implemented by a software program which runs on the processor integrated inside the chip, and the rest of the modules/units can be implemented by hardware such as circuits. For each device and product applied to or integrated in the chip module, each module/unit included therein can be implemented by hardware such as circuits, and different modules/units can be located in the same component (such as chip, circuit, etc.) or in different components of the chip module, or, at least some modules/units can be implemented in the form of software programs that run on the processor integrated inside the chip module, and the remaining part of the modules/units can be implemented in hardware such as circuits. For each device or product applied to or integrated in the UE, each module/unit included therein may be implemented in hardware such as circuits, and different modules/units may be located in the same component (for example, chip, circuit module, etc.) or in different components of the terminal, or at least some of the modules/units can be implemented by software programs which run on the processor integrated in the UE, and the rest of the modules/units can be implemented by hardware such as circuits.

When there are fewer data services, a base station (gNB) transmits signaling indicating that a certain SCell enters a dormant (dormancy) state to a user equipment (UE). Upon receiving the signaling indicating that the SCell enters the dormant state, the UE switches to a dormant bandwidth part (BWP) for the SCell, that is, the dormant BWP is used as an active BWP. The UE does not need to monitor a physical downlink control channel (PDCCH) on the dormant BWP, thus saving power (or energy).

When there are more data services, the base station transmits signaling indicating that the SCell enters a non-dormant (non-dormancy) state to the UE. Upon receiving the signaling indicating that the SCell enters the non-dormant state, the UE switches back to a non-dormant BWP, that is, the non-dormant BWP is used as an active BWP. The UE needs to monitor the PDCCHs on the non-dormant BWP, and may acquire more scheduling opportunities on the SCell, so higher-rate data services can be supported. By switching between SCell dormancy and SCell non-dormancy, adaptation between data rate (throughput) and power saving can be achieved.

During Discontinuous Reception (DRX) Active Time, signaling of switching between SCell dormancy and SCell non-dormancy (that is, signaling of entering SCell dormancy and signaling of entering SCell non-dormancy) is often achieved by adding additional X1 bits (X1 is a positive integer) in a DCI format. The X1 bits indicate in the form of a bitmap whether each SCell group in X1 SCell groups enters the dormant state or the non-dormant state, or whether each of X1 SCells enters the dormant state or the non-dormant state.

Through a similar manner as described above, the UE can also be indicated to reduce PDCCH monitoring corresponding to the primary cell (PCell) or the primary secondary cell (PSCell, referring to a primary cell of a slave node in dual connectivity), so as to achieve further power saving. In this case, additional X2 bits (X2 is a positive integer) may be added to the DCI format as signaling for switching between normal PDCCH monitoring and reduced PDCCH monitoring.

However, how to use fewer bits to indicate reducing the PDCCH monitoring corresponding to the SCell and reducing the PDCCH monitoring corresponding to the PCell, the PSCell, or the SCell, is an urgent problem to be solved.

As illustrated in FIG. 1, a method for controlling PDCCH monitoring is provided. The method may be applied to a user equipment (UE) side, where the UE may be a phone, a tablet computer, etc.

The method may include operations at S10 and S11.

At S10, the UE acquires first signaling.

At S11, the UE determines, according to the first signaling, whether a secondary cell (SCell) is in a dormant state or a non-dormant state.

Specifically, the first signaling may be a bitmap. Preferably, the bitmap is a sequence consisting of "1" and "0".

In some embodiments, the bitmap has N bits, where N is an integer.

Specifically, the first signaling may be a field in downlink control information (DCI).

The method may further include operations at S12 to S15.

At S12, the UE acquires second signaling.

At S13, the UE determines, according to the second signaling, whether to stop monitoring PDCCHs corresponding to a primary cell (PCell), a primary secondary cell (PSCell), or the SCell, where the second signaling may be a bit in the bitmap.

At S14, if the bit in the bitmap is "0", the UE determines to stop monitoring the PDCCHs corresponding to the PCell, the PSCell, or the SCell.

At S15, if the bit in the bitmap is "1", the UE determines to monitor the PDCCHs corresponding to the PCell, the PSCell, or the SCell.

Those skilled in the art can understand that the meanings represented by "0" and "1" are not limited to the above description. For example, if the bit in the bitmap is "0", the UE may also determine to monitor PDCCHs corresponding to the PCell, the PSCell, or the SCell, and if the bit in the bitmap is "1", the UE may also determine to stop monitoring the PDCCHs corresponding to the PCell, the PSCell, or the SCell.

In some implementations, a position of the bit in the bitmap is provided by a higher layer parameter. The higher layer parameter is transmitted from a gNB to the UE. The higher layer parameter may be configured semi-statically. For example, the bitmap may have 5 bits "01010", where each bit indicates respectively whether a SCell is in a dormant state or a non-dormant state, and the higher signaling may indicate that the fifth bit is used to indicate whether to monitor the PDCCHs corresponding to the PCell, the PSCell, or the SCell. In this case, the fifth bit "0" not only indicates that the corresponding SCell is in the dormant state (that is, the UE does not need to monitor the PDCCHs corresponding to the SCell), but also indicates that the UE does not need to monitor the PDCCHs corresponding to the PSCell or the PCell.

Specifically, the first signaling may be a field in the DCI. The second signaling may also be a field in the DCI, and the field corresponding to the second signaling is a part of the field corresponding to the first signaling.

Specifically, the field corresponding to the second signaling starts at or after a start position of the field corresponding to the first signaling, and the field corresponding to the second signaling ends at or before an end position of the field corresponding to the first signaling. In this way, bit overhead of the DCI can be reduced.

In some embodiments, the bit in the bitmap is in a first preset pattern. The first preset pattern may include two indications, that is, "TRUE" or "FALSE". "0" may indicate "FALSE" and "1" may indicate "TRUE". Alternatively, "0" may indicate "TRUE" and "1" may indicate "FALSE".

The first preset pattern may also be provided by the higher layer parameter.

In some embodiments, stopping monitoring the PDCCHs corresponding to the PCell, the PSCell, or the SCell may include stopping a drx-onDurationTimer and/or a drx-InactivityTimer.

Stopping monitoring the PDCCHs corresponding to the PCell, the PSCell, or the SCell may further include at least one of: stopping monitoring the PDCCHs corresponding to the PCell, the PSCell, or the SCell during DRX active time; stopping monitoring the PDCCHs corresponding to the PCell, the PSCell, or the SCell during DRX active time indicated by the drx-onDurationTimer and/or the drx-InactivityTimer; switching to a dormant BWP for the PCell, the PSCell, or the SCell during DRX active time; using the dormant BWP as an active BWP for the PCell, the PSCell, or the SCell during the DRX active time; switching to the dormant BWP for the PCell, the PSCell, or the SCell during DRX active time indicated by the drx-onDurationTimer and/or the drx-InactivityTimer; or using the dormant BWP as the active BWP for the PCell, the PSCell, or the SCell during the DRX active time indicated by the drx-onDurationTimer and/or the drx-InactivityTimer.

In the method for controlling PDCCH monitoring in above embodiments, the bit originally indicating SCell dormancy or SCell non-dormancy is reused to indicate whether to monitor the PDCCHs corresponding to the PCell, the PSCell, or the SCell, which can not only reduce signaling overhead but also achieve power saving of the UE.

In addition, by stopping monitoring the PDCCHs corresponding to the PCell and the PSCell during the DRX active time, PDCCH monitoring on the PCell/PSCell can be reduced only during current DRX active time, which can not only save power, but also ensure that normal PDCCH monitoring can be quickly restored in subsequent DRX cycles.

As illustrated in FIG. 2, a method for controlling PDCCH monitoring is provided in embodiments of the disclosure. The method may be applied to a UE side, where the UE may be a phone, a tablet computer, etc.

The method may include operations at S20 to S23.

At S20, the UE acquires first signaling.

At S21, the UE determines, according to the first signaling, whether a SCell is in a dormant state or a non-dormant state, where the first signaling is a bitmap. Preferably, the bitmap is a sequence consisting of "1" and "0".

In some embodiments, the bitmap has N bits, where N is an integer.

Specifically, the first signaling may be a field in DCI.

At S22, if all bits in the bitmap are "0", the UE determines to stop monitoring PDCCHs corresponding to a PCell, a PSCell, or the SCell.

At S23, if all bits in the bitmap are "1", the UE determines to monitor the PDCCHs corresponding to the PCell, the PSCell, or the SCell.

It can be understood that if the bits of the bitmap are all "0", the UE determines that all SCells enter the dormant state, and at the same time the UE determines to stop monitoring the PDCCHs corresponding to the PCell and the PSCell. If the bits of the bitmap are all "1", the UE determines that all SCells enter the non-dormant state, and at the same time the UE determines to monitor the PDCCHs corresponding to the PCell and the PSCell.

Stopping monitoring the PDCCHs corresponding to the PCell, the PSCell, or the SCell may include stopping a drx-onDurationTimer and/or a drx-InactivityTimer.

Stopping monitoring the PDCCHs corresponding to the PCell, the PSCell, or the SCell may include at least one of: stopping monitoring the PDCCHs corresponding to the PCell, the PSCell, or the SCell during DRX active time; or stopping monitoring the PDCCHs corresponding to the PCell, the PSCell, or the SCell during DRX active time indicated by the drx-onDurationTimer and/or the drx-InactivityTimer.

Specifically, stopping monitoring the PDCCHs corresponding to the PCell, the PSCell, or the SCell may include at least one of: switching to a dormant BWP for the PCell, the PSCell, or the SCell during the DRX active time; using the dormant BWP as an active BWP for the PCell, the PSCell, or the SCell during the DRX active time; switching to the dormant BWP for the PCell, the PSCell, or the SCell during DRX active time indicated by the drx-onDuration-Timer and/or the drx-InactivityTimer; or using the dormant BWP as the active BWP for the PCell, the PSCell, or the SCell during the DRX active time indicated by the drx-onDurationTimer and/or the drx-InactivityTimer.

In the method for controlling PDCCH monitoring in above embodiments, by checking the values of all the bits in the bitmap, it is not necessary to determine through the higher layer parameter which bit is used to indicate whether to monitor the PDCCHs corresponding to the PCell, the PSCell, or the SCell, which can achieve flexible and quick control of PDCCH monitoring.

In addition, by stopping monitoring the PDCCHs for the PCell and the PSCell during the DRX active time, PDCCH monitoring on the PCell/PSCell can be reduced only during current DRX active time, which can not only save power, but also ensure that normal PDCCH monitoring can be quickly restored in subsequent DRX cycles.

Figure 3:
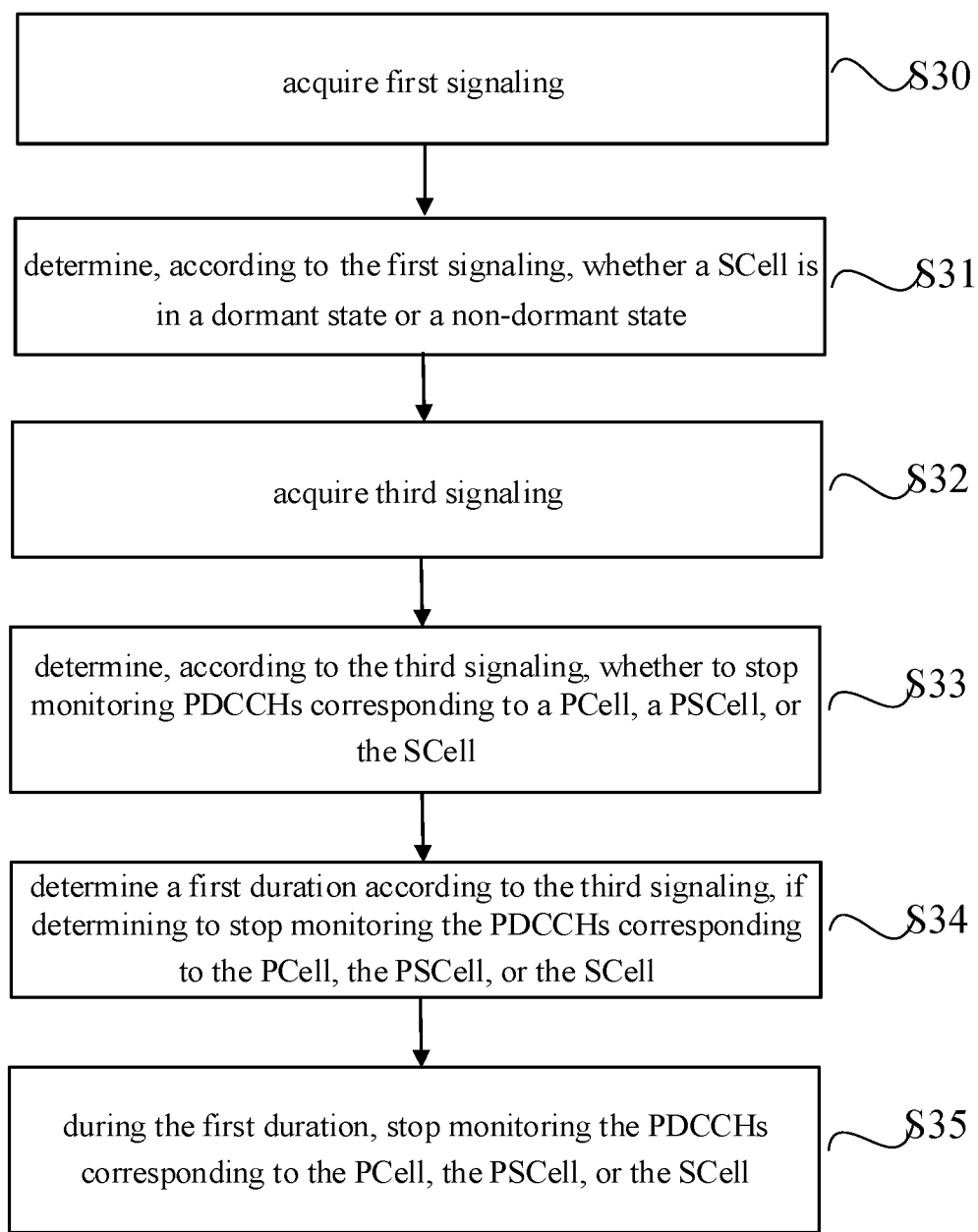
FIG. 3 is a flowchart of a method for controlling PDCCH monitoring in embodiments of the disclosure.

As illustrated in FIG. 3, a method for controlling PDCCH monitoring is provided in embodiments of the disclosure. The method may be applied to a UE side, where the UE may be a phone, a tablet computer, etc.

The method may include operations at S30 and S31.

At S30, the UE acquires first signaling.

At S31, the UE determines, according to the first signaling, whether a SCell is in a dormant state or a non-dormant state.

Specifically, the first signaling may be a bitmap. Preferably, the bitmap is a sequence consisting of "1" and "0".

In some embodiments, the bitmap has N bits, where N is an integer.

Specifically, the first signaling may be a field in DCI.

The method may further include operations at S32 to S35.

At S32, the UE acquires third signaling.

At S33, the UE determines, according to the third signaling, whether to stop monitoring PDCCHs corresponding to a PCell, a PSCell, or the SCell.

At S34, the UE determines a first duration according to the third signaling, if determining to stop monitoring the PDCCHs corresponding to the PCell, the PSCell, or the SCell.

At S35, during the first duration, the UE stops monitoring the PDCCHs corresponding to the PCell, the PSCell, or the SCell.

The third signaling may be one or more bits in the bitmap. If the third signaling is in a second preset pattern, the UE determines to stop monitoring the PDCCHs corresponding to the PCell, the PSCell, or the SCell.

The second preset pattern may indicate "TRUE" or "FALSE". In case that multiple bits form the second preset pattern, the second preset pattern may include multiple bit-combinations, or multiple code points. For example, in case that two bits form the second preset pattern, there may be one bit-combination "00" representing "FALSE", and three bit-combinations representing "TRUE", that is, "01", "10", and "11". These three bit-combinations may be referred to as the second preset pattern.

Further, the first duration may be determined according to the third signaling. Optionally, the third signaling corresponds to the first duration.

A correspondence between the first duration and the third signaling is provided by a higher layer parameter.

Upon determining to stop monitoring the PDCCHs corresponding to the PCell, the PSCell, or the SCell, a timer may be started, where a duration of the timer is the first duration. Until the end of the first duration, stop monitoring or continue to monitor the PDCCHs corresponding to the PCell, the PSCell, or the SCell.

Specifically, the first signaling may be a field in the DCI. The third signaling may also be a field in the DCI, and the field corresponding to the third signaling is a part of the field corresponding to the first signaling.

Specifically, the field corresponding to the third signaling starts at or after a start position of the field corresponding to the first signaling, and the field corresponding to the third signaling ends at or before an end position of the field corresponding to the first signaling. In this way, bit overhead of the DCI can be reduced.

Specifically, the first duration is an intersection between a duration provided by the higher layer parameter and DRX active time, or an intersection between the duration provided by the higher layer parameter and DRX active time indicated by a drx-onDurationTimer and/or a drx-InactivityTimer.

In some embodiments, stopping monitoring the PDCCHs corresponding to the PCell, the PSCell, or the SCell may include at least one of: stopping monitoring the PDCCHs corresponding to the PCell, the PSCell, or the SCell during the first duration; stopping monitoring the PDCCHs corresponding to the PCell, the PSCell, or the SCell during an intersection between the first duration and DRX active time; or stopping monitoring the PDCCHs corresponding to the PCell, the PSCell, or the SCell during an intersection between the first duration and DRX active time indicated by the drx-onDurationTimer and/or the drx-InactivityTimer.

Specifically, stopping monitoring the PDCCHs corresponding to the PCell, the PSCell, or the SCell may include at least one of: switching to a dormant BWP for the PCell, the PSCell, or the SCell during the first duration; using the dormant BWP as an active BWP for the PCell, the PSCell, or the SCell during the first duration; switching to the dormant BWP for the PCell, the PSCell, or the SCell during the intersection between the first duration and DRX active time; using the dormant BWP as the active BWP for the PCell, the PSCell, or the SCell during the intersection between the first duration and the DRX active time; switching to the dormant BWP for the PCell, the PSCell, or the SCell during the intersection between the first duration and DRX active time indicated by a drx-onDurationTimer and/or a drx-InactivityTimer; or using the dormant BWP as the active BWP for the PCell, the PSCell, or the SCell during the intersection between the first duration and the DRX active time indicated by the drx-onDurationTimer and/or the drx-InactivityTimer.

In the method for controlling PDCCH monitoring in above embodiments, by configuring the first duration for stopping PDCCH monitoring, the duration for reducing monitoring the PDCCHs on the PCell/PSCell can be pre-configured as needed. In addition, PDCCH monitoring on the PCell/PSCell can be reduced only during the first duration within current DRX active time, which can not only save power, but also ensure that normal PDCCH monitoring can be quickly restored in subsequent DRX cycles.

As illustrated in FIG. 4, a method for controlling PDCCH monitoring is provided in embodiments of the disclosure. The method may be applied to a UE side, where the UE may be a phone, a tablet computer, etc.

The method may include operations at S40 and S41.

At S40, the UE acquires first signaling.

At S41, the UE determines, according to the first signaling, whether a SCell is in a dormant state or a non-dormant state.

Specifically, the first signaling may be a bitmap. Preferably, the bitmap is a sequence consisting of "1" and "0".

In some embodiments, the bitmap has N bits, where N is an integer.

Specifically, the first signaling may be a field in DCI.

The method may further include operations at S42 to S46.

At S42, the UE acquires fourth signaling.

At S43, the UE determines, according to the fourth signaling, whether to stop monitoring PDCCHs corresponding to a PCell, a PSCell, or the SCell.

At S44, the UE acquires fifth signaling if determining to stop monitoring the PDCCHs corresponding to the PCell, the PSCell, or the SCell.

At S45, the UE determines a second duration according to the fifth signaling.

At S46, during the second duration, the UE stops monitoring the PDCCHs corresponding to the PCell, the PSCell, or the SCell.

The fourth signaling may be one or more bits in the bitmap.

Specifically, the fourth signaling may be a field in the DCI. If the fourth signaling is value "0", the UE determines to stop monitoring the PDCCHs corresponding to the PCell, the PSCell, or the SCell. If the fourth signaling is value "1", the UE determines to monitor the PDCCHs corresponding to the PCell, the PSCell, or the SCell.

Specifically, the first signaling may be a field in the DCI. The fourth signaling may also be a field in the DCI, and the field corresponding to the fourth signaling is a part of the field corresponding to the first signaling. If the fourth signaling follows a third preset pattern, the UE determines to stop monitoring the PDCCHs corresponding to the PCell, the PSCell, or the SCell. Optionally, if the fourth signaling follows a fourth preset pattern, the UE determines to monitor the PDCCHs corresponding to the PCell, the PSCell, or the SCell.

Further, the second duration may be determined according to the fifth signaling. Optionally, the fifth signaling corresponds to the second duration. Upon determining to stop monitoring the PDCCHs corresponding to the PCell, the PSCell, or the SCell, a timer may be started, where a duration of the timer is the second duration. Until the end of the second duration, stop monitoring or continue to monitor the PDCCHs corresponding to the PCell, the PSCell, or the SCell.

The fifth signaling may be one or more bits in the bitmap. After the UE determines to stop monitoring the PDCCHs corresponding to the PCell, the PSCell, or the SCell, the SCell(s) corresponding to the bitmap enter the dormant state by default, so that the one or more bits in the bitmap are no longer used to indicate SCell dormancy or SCell non-dormancy, but can be used to indicate the second duration.

A correspondence between the second duration and the fifth signaling is provided by a higher layer parameter. Specifically, the first signaling may be a field in the DCI, and the fifth signaling may also be a field in the DCI, where the field corresponding to the fifth signaling may be a part of the field corresponding to the first signaling.

Specifically, the field corresponding to the fifth signaling starts at or after a start position of the field corresponding to the first signaling, and the field corresponding to the fifth signaling ends at or before an end position of the field corresponding to the first signaling. In this way, bit overhead of the DCI can be reduced.

The second duration is an intersection between a duration provided by the higher layer parameter and DRX active time, or an intersection between the duration provided by the higher layer parameter and DRX active time indicated by a drx-onDurationTimer and/or a drx-InactivityTimer.

In some embodiments, stopping monitoring the PDCCHs corresponding to the PCell, the PSCell, or the SCell may include at least one of: stopping monitoring the PDCCHs corresponding to the PCell, the PSCell, or the SCell during the second duration; stopping monitoring the PDCCHs corresponding to the PCell, the PSCell, or the SCell during an intersection between the second duration and the DRX active time; or stopping monitoring the PDCCHs corresponding to the PCell, the PSCell, or the SCell during an intersection between the second duration and DRX active time indicated by the drx-onDurationTimer and/or the drx-InactivityTimer.

Specifically, stopping monitoring the PDCCHs corresponding to the PCell, the PSCell, or the SCell may include at least one of: switching to a dormant BWP for the PCell, the PSCell, or the SCell during the second duration; using the dormant BWP as an active BWP for the PCell, the PSCell, or the SCell during the second duration; switching to the dormant BWP for the PCell, the PSCell, or the SCell during the intersection between the second duration and the DRX active time; using the dormant BWP as the active BWP for the PCell, the PSCell, or the SCell during the intersection between the second duration and the DRX active time; switching to the dormant BWP for the PCell, the PSCell, or the SCell during the intersection between the second duration and DRX active time indicated by the drx-onDurationTimer and/or the drx-InactivityTimer; or using the dormant BWP as the active BWP for the PCell, the PSCell, or the SCell during the intersection between the second duration and the DRX active time indicated by the drx-onDurationTimer and/or the drx-InactivityTimer.

In the method for controlling PDCCH monitoring in above embodiments, by configuring the second duration for stopping PDCCH monitoring within the DRX active time, the duration for reducing monitoring the PDCCHs on the PCell/PSCell within the DRX active time can be adjusted more flexibly according to actual situations. In addition, PDCCH monitoring on the PCell/PSCell can be reduced only during the second duration within the current DRX active time, which can not only save power, but also ensure that normal PDCCH monitoring can be quickly restored in subsequent DRX cycles.

Figure 5:
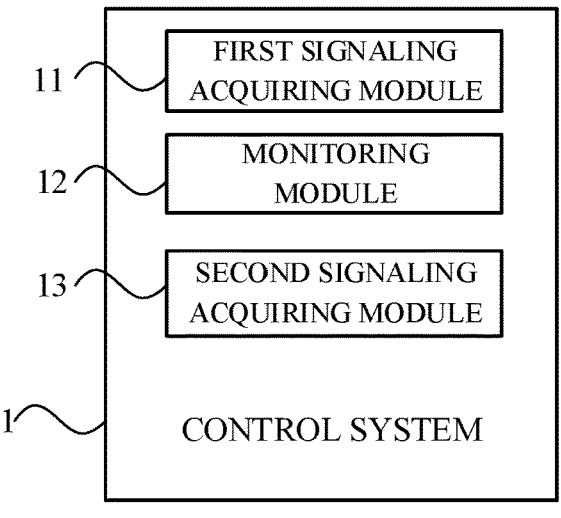
FIG. 5 is a structural block diagram of a system for controlling PDCCH monitoring in embodiments of the disclosure.

As illustrated in FIG. 5, a system for controlling PDCCH monitoring is provided. The system may be applied to a UE side, where the UE may be a phone, a tablet computer, etc.

The system 1 may include a first signaling acquiring module 11 and a monitoring module 12.

The first signaling acquiring module 11 is configured to acquire first signaling.

The monitoring module 12 is configured to determine, according to the first signaling, whether a SCell is in a dormant state or a non-dormant state.

Specifically, the first signaling may be a bitmap. Preferably, the bitmap is a sequence consisting of "1" and "0".

In some embodiments, the bitmap has N bits, where N is an integer.

Specifically, the first signaling may be a field in DCI.

The system 1 may further include a second signaling acquiring module 13.

The second signaling acquiring module 13 is configured to acquire second signaling.

The monitoring module 12 is further configured to determine, according to the second signaling, whether to stop monitoring PDCCHs corresponding to a PCell, a PSCell, or the SCell, where the second signaling may be a bit in the bitmap.

If the bit in the bitmap is "0", the monitoring module 12 determines to stop monitoring the PDCCHs corresponding to the PCell, the PSCell, or the SCell.

If the bit in the bitmap is "1", the monitoring module 12 determines to monitor the PDCCHs corresponding to the PCell, the PSCell, or the SCell.

In some implementations, a position of the bit in the bitmap is provided by a higher layer parameter. The higher layer parameter is transmitted from a gNB to the UE. The higher layer parameter may be configured semi-statically. For example, the bitmap may have 5 bits "01010", where each bit indicates respectively whether a SCell is in a dormant state or a non-dormant state. The higher signaling may indicate that the fifth bit is used to indicate whether to monitor the PDCCHs corresponding to the PCell, the PSCell, or the SCell. In this case, the fifth bit "0" not only indicates that the corresponding SCell is in the dormant state (that is, the UE does not need to monitor the PDCCHs corresponding to the SCell), but also indicates that the UE does not need to monitor the PDCCHs corresponding to the PSCell or the PCell.

Specifically, the first signaling may be a field in the DCI. The second signaling may also be a field in the DCI, and the field corresponding to the second signaling is a part of the field corresponding to the first signaling.

Specifically, the field corresponding to the second signaling starts at or after a start position of the field corresponding to the first signaling, and the field corresponding to the second signaling ends at or before an end position of the field corresponding to the first signaling. In this way, bit overhead of the DCI can be reduced.

In some embodiments, the bit in the bitmap is in a first preset pattern. The first preset pattern may include two indications, that is, "TRUE" or "FALSE". "0" may indicate "FALSE" and "1" may indicate "TRUE". Alternatively, "0" may indicate "TRUE" and "1" may indicate "FALSE".

The first preset pattern may also be provided by the higher layer parameter.

Specifically, the monitoring module 12 stops a drx-on-DurationTimer (on duration timer) and/or a drx-Inactivity-Timer (inactivity timer).

Specifically, the monitoring module 12 performs at least one of the following.

During DRX active time, the monitoring module 12 stops monitoring the PDCCHs corresponding to the PCell, the PSCell, or the SCell; or during DRX active time indicated by the drx-onDurationTimer and/or the drx-InactivityTimer, the monitoring module 12 stops monitoring the PDCCHs corresponding to the PCell, the PSCell, or the SCell.

More specifically, the monitoring module 12 switches to a dormant BWP for the PCell, the PSCell, or the SCell during the DRX active time; the monitoring module 12 uses the dormant BWP as an active BWP for the PCell, the PSCell, or the SCell during the DRX active time; the monitoring module 12 switches to the dormant BWP for the PCell, the PSCell, or the SCell during DRX active time indicated by the drx-onDurationTimer and/or the drx-Inactivity-Timer; or the monitoring module 12 uses the dormant BWP as the active BWP for the PCell, the PSCell, or the SCell during the DRX active time indicated by the drx-onDurationTimer and/or the drx-InactivityTimer.

In the system for controlling PDCCH monitoring in above embodiments, in operation, the bit originally indicating SCell dormancy or SCell non-dormancy is reused to indicate whether to monitor the PDCCHs corresponding to the PCell, the PSCell, or the SCell, which can not only reduce signaling overhead but also achieve power saving of the UE.

In addition, by stopping monitoring the PDCCHs corresponding to the PCell and the PSCell during the DRX active time, PDCCH monitoring on the PCell/PSCell can be reduced only during current DRX active time, which can not only save power, but also ensure that normal PDCCH monitoring can be quickly restored in subsequent DRX cycles.

Figure 6:
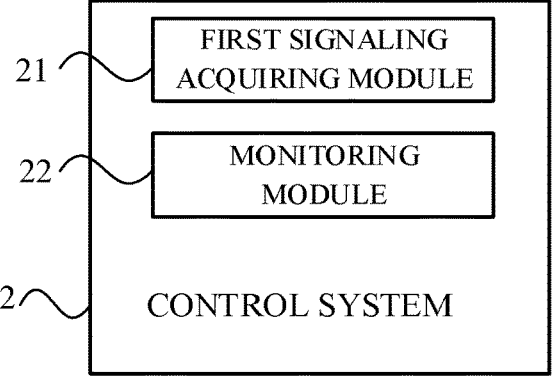
FIG. 6 is a structural block diagram of a system for controlling PDCCH monitoring in embodiments of the disclosure.

As illustrated in FIG. 6, a system for controlling PDCCH monitoring is provided in embodiments of the disclosure. The system may be applied to a UE side, where the UE may be a phone, a tablet computer, etc.

The system 2 includes a first signaling acquiring module 21 and a monitoring module 22.

The first signaling acquiring module 21 is configured to acquire first signaling.

The monitoring module 22 is configured to determine, according to the first signaling, whether a SCell is in a dormant state or a non-dormant state, where the first signaling is a bitmap.

In some embodiments, the bitmap has N bits, where N is an integer.

Specifically, the first signaling may be a field in DCI.

If all bits in the bitmap is "0", the monitoring module 22 determines to stop monitoring PDCCHs corresponding to a PCell, a PSCell, or the SCell.

If all bits in the bitmap is "1", the monitoring module 22 determines to monitor the PDCCHs corresponding to the PCell, the PSCell, or the SCell.

It can be understood that if the bits of the bitmap are all "0", the monitoring module 22 determines that all SCells enter the dormant state, and at the same time the monitoring module 22 determines to stop monitoring the PDCCHs corresponding to the PCell and the PSCell. If the bits of the bitmap are all "1", the monitoring module 22 determines that all SCells enter the non-dormant state, and at the same time the monitoring module 22 determines to monitor the PDCCHs corresponding to the PCell and the PSCell.

The monitoring module 22 may stop a drx-onDuration-Timer and/or a drx-InactivityTimer.

Specifically, the monitoring module 22 may perform at least one of the following.

The monitoring module 22 stops monitoring the PDCCHs corresponding to the PCell, the PSCell, or the SCell during DRX active time; or the monitoring module 22 stops monitoring the PDCCHs corresponding to the PCell, the PSCell, or the SCell during DRX active time indicated by the drx-onDurationTimer and/or the drx-InactivityTimer.

More specifically, the monitoring module 22 switches to a dormant BWP for the PCell, the PSCell, or the SCell during the DRX active time; the monitoring module 22 uses the dormant BWP as an active BWP for the PCell, the PSCell, or the SCell during the DRX active time; the monitoring module 22 switches to the dormant BWP for the PCell, the PSCell, or the SCell during DRX active time indicated by the drx-onDurationTimer and/or the drx-Inactivity Timer; or the monitoring module 22 uses the dormant BWP as the active BWP for the PCell, the PSCell, or the SCell during the DRX active time indicated by the drx-onDurationTimer and/or the drx-InactivityTimer.

In the system for controlling PDCCH monitoring in above embodiments, in operation, by checking the values of all the bits in the bitmap, the system does not need to determine through the higher layer parameter which bit is used to indicate whether to monitor the PDCCHs corresponding to the PCell, the PSCell, or the SCell, which can achieve flexible and quick control of PDCCH monitoring.

In addition, by stopping monitoring the PDCCHs for the PCell and the PSCell during the DRX active time, PDCCH monitoring on the PCell/PSCell can be reduced only during current DRX active time, which can not only save power, but also ensure that normal PDCCH monitoring can be quickly restored in subsequent DRX cycles.

Figure 7:
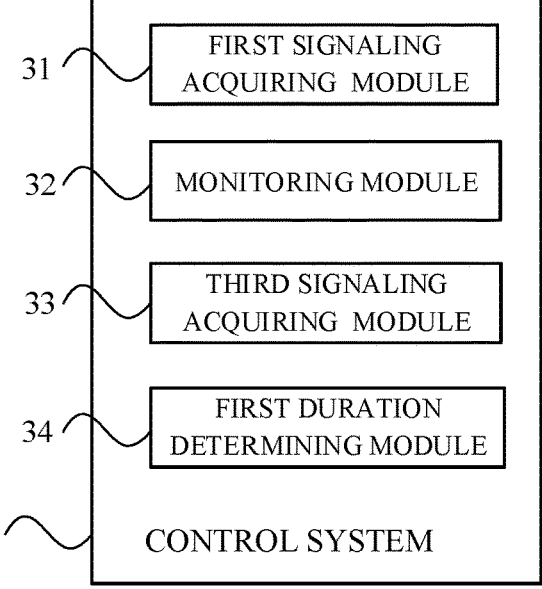
FIG. 7 is a structural block diagram of a system for controlling PDCCH monitoring in embodiments of the disclosure.

As illustrated in FIG. 7, a system for controlling PDCCH monitoring is provided in embodiments of the disclosure. The system may be applied to a UE side, where the UE may be a phone, a tablet computer, etc.

The system 3 may include a first signaling acquiring module 31 and a monitoring module 32.

The first signaling acquiring module 31 is configured to acquire first signaling.

The monitoring module 32 is configured to determine, according to the first signaling, whether a SCell is in a dormant state or a non-dormant state.

Specifically, the first signaling may be a bitmap. Preferably, the bitmap is a sequence consisting of "1" and "0".

In some embodiments, the bitmap has N bits, where N is an integer.

Specifically, the first signaling may be a field in DCI.

The system 3 may further include a third signaling acquiring module 33 and a first duration determining module 34.

The third signaling acquiring module 33 is configured to acquire third signaling.

The monitoring module 32 is further configured to determine, according to the third signaling, whether to stop monitoring PDCCHs corresponding to a PCell, a PSCell, or the SCell.

If the monitoring module 32 determines to stop monitoring the PDCCHs corresponding to the PCell, the PSCell, or the SCell, the first duration determining module 34 is invoked to determine a first duration according to the third signaling.

The first duration determining module 34 is further configured to invoke the monitoring module 32 to stop monitoring the PDCCHs corresponding to the PCell, the PSCell, or the SCell during the first duration.

The third signaling may be one or more bits in the bitmap. If the one or more bits in the bitmap are in a second preset pattern, the monitoring module 32 determines to stop monitoring the PDCCHs corresponding to the PCell, the PSCell, or the SCell.

The second preset pattern is used for indicating "TRUE" or "FALSE". In case that multiple bits form the second preset pattern, the second preset pattern may include multiple bit-combinations, or multiple code points. For example, in case that 2 bits form the second preset pattern, there may be one bit-combination "00" representing "FALSE", and three bit-combinations representing "TRUE", that is, "01", "10", and "11". These three bit-combinations may be referred to as the second preset pattern.

Further, the first duration may be determined according to the third signaling, or the third signaling corresponds to the first duration.

A correspondence between the first duration and the third signaling is provided by a higher layer parameter.

Specifically, the first signaling may be a field in the DCI. The third signaling may also be a field in the DCI, and the field corresponding to the third signaling is a part of the field corresponding to the first signaling.

Specifically, the field corresponding to the third signaling starts at or after a start position of the field corresponding to the first signaling, and the field corresponding to the third signaling ends at or before an end position of the field corresponding to the first signaling. In this way, bit overhead of the DCI can be reduced.

Upon determining to stop monitoring the PDCCHs corresponding to the PCell, the PSCell, or the SCell, a timer may be started, where a duration of the timer is the first duration. Until the end of the first duration, stop monitoring or continue to monitor the PDCCHs corresponding to the PCell, the PSCell, or the SCell.

Specifically, the first duration is an intersection between a duration provided by the higher layer parameter and DRX active time, or an intersection between the duration provided by the higher layer parameter and DRX active time indicated by a drx-onDurationTimer and/or a drx-InactivityTimer.

In some embodiments, the monitoring module 22 may stop monitoring the PDCCHs corresponding to the PCell, the PSCell, or the SCell during the first duration; the monitoring module 22 may stop monitoring the PDCCHs corresponding to the PCell, the PSCell, or the SCell during an intersection between the first duration and DRX active time; or the monitoring module 22 may stop monitoring the PDCCHs corresponding to the PCell, the PSCell, or the SCell during an intersection between the first duration and DRX active time indicated by the drx-onDurationTimer and/or the drx-InactivityTimer.

Specifically, the monitoring module 22 may switch to a dormant BWP for the PCell, the PSCell, or the SCell during the first duration; the monitoring module 22 may use the dormant BWP as an active BWP for the PCell, the PSCell, or the SCell during the first duration; the monitoring module 22 may switch to the dormant BWP for the PCell, the PSCell, or the SCell during the intersection between the first duration and DRX active time; the monitoring module 22 may use the dormant BWP as the active BWP for the PCell, the PSCell, or the SCell during the intersection between the first duration and the DRX active time; the monitoring module 22 may switch to the dormant BWP for the PCell, the PSCell, or the SCell during the intersection between the first duration and DRX active time indicated by a drx-onDurationTimer and/or a drx-InactivityTimer; or the monitoring module 22 may use the dormant BWP as the active BWP for the PCell, the PSCell, or the SCell during the intersection between the first duration and the DRX active time indicated by the drx-onDurationTimer and/or the drx-InactivityTimer.

In the system for controlling PDCCH monitoring in above embodiments, by configuring the first duration for stopping PDCCH monitoring, the duration for reducing monitoring the PDCCHs on the PCell/PSCell can be pre-configured as needed. In addition, PDCCH monitoring on the PCell/PSCell can be reduced only during the first duration within current DRX active time, which can not only save power, but also ensure that normal PDCCH monitoring can be quickly restored in subsequent DRX cycles.

Figure 8:
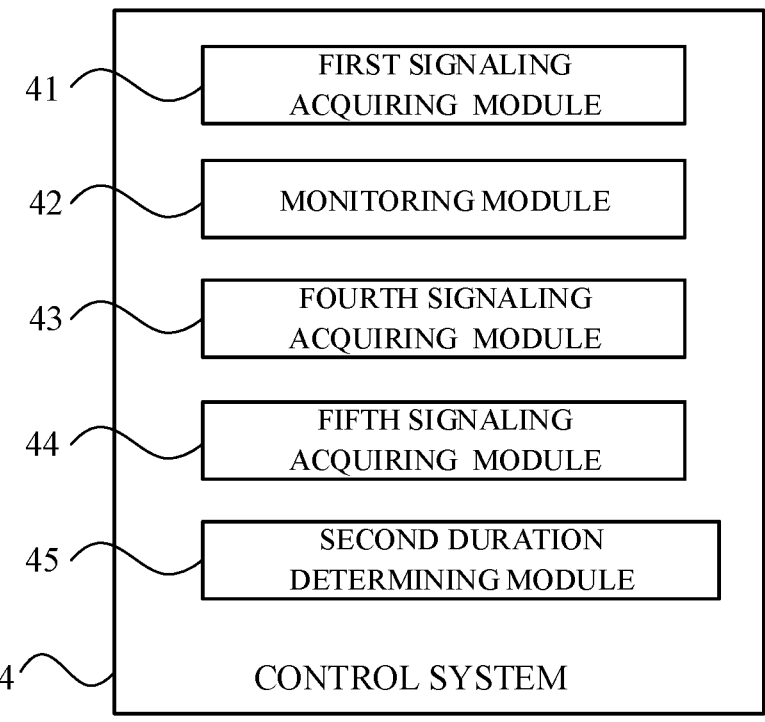
FIG. 8 is a structural block diagram of a system for controlling PDCCH monitoring in embodiments of the disclosure.

As illustrated in FIG. 8, a system for controlling PDCCH monitoring is provided in embodiments of the disclosure. The method may be applied to a UE side, where the UE may be a phone, a tablet computer, etc.

The system 4 may include a first signaling acquiring module 41 and a monitoring module 42.

The first signaling acquiring module 41 is configured to acquire first signaling.

The monitoring module 42 is configured to determine, according to the first signaling, whether a SCell is in a dormant state or a non-dormant state.

Specifically, the first signaling may be a bitmap. Preferably, the bitmap is a sequence consisting of "1" and "0".

In some embodiments, the bitmap has N bits, where N is an integer.

Specifically, the first signaling may be a field in DCI.

The system 4 may further include a fourth signaling acquiring module 43, a fifth signaling acquiring module 44, and a second duration determining module 45.

The fourth signaling acquiring module 43 is configured to acquire fourth signaling.

The monitoring module 42 is configured to determine, according to the fourth signaling, whether to stop monitoring PDCCHs corresponding to a PCell, a PSCell, or the SCell.

If the monitoring module 42 determines to stop monitoring the PDCCHs corresponding to the PCell, the PSCell, or the SCell, the fifth signaling acquiring module 44 is invoked to acquire fifth signaling.

The second duration determining module 45 is configured to determine a second duration according to the fifth signaling.

The second duration determining module 45 is further configured to invoke the monitoring module 42 to stop monitoring the PDCCHs corresponding to the PCell, the PSCell, or the SCell during the second duration.

The fourth signaling may be one or more bits in the bitmap.

Specifically, the fourth signaling may be a field in the DCI. If the fourth signaling is value "0", the monitoring module 42 determines to stop monitoring the PDCCHs corresponding to the PCell, the PSCell, or the SCell. If the fourth signaling is value "1", the monitoring module 42 determines determined to monitor the PDCCHs corresponding to the PCell, the PSCell, or the SCell.

Specifically, the first signaling may be a field in the DCI. The fourth signaling may also be a field in the DCI, and the field corresponding to the fourth signaling is a part of the field corresponding to the first signaling. If the fourth signaling follows a third preset pattern, the monitoring module 42 determines to stop monitoring the PDCCHs corresponding to the PCell, the PSCell, or the SCell. Optionally, if the fourth signaling follows a fourth preset pattern, the monitoring module 42 determines to monitor the PDCCHs corresponding to the PCell, the PSCell, or the SCell.

Further, the second duration may be determined according to the fifth signaling, or the fifth signaling corresponds to the second duration. Upon determining to stop monitoring the PDCCHs corresponding to the PCell, the PSCell, or the SCell, a timer may be started, where a duration of the timer is the second duration. Until the end of the second duration, stop monitoring or continue to monitor the PDCCHs corresponding to the PCell, the PSCell, or the SCell.

The fifth signaling may be one or more bits in the bitmap. After the monitoring module 42 determines to stop monitoring the PDCCHs corresponding to the PCell, the PSCell, or the SCell, the SCell(s) corresponding to the bitmap enter the dormant state by default, so that the one or more bits in the bitmap are no longer used to indicate SCell dormancy or SCell non-dormancy, but can be used to indicate the second duration instead.

A correspondence between the second duration and the fifth signaling is provided by a higher layer parameter.

Specifically, the first signaling may be a field in the DCI, and the fifth signaling may also be a field in the DCI, where the field corresponding to the fifth signaling may be a part of the field corresponding to the first signaling.

Specifically, the field corresponding to the fifth signaling starts at or after a start position of the field corresponding to the first signaling, and the field corresponding to the fifth signaling ends at or before an end position of the field corresponding to the first signaling. In this way, bit overhead of the DCI can be reduced.

The second duration may be an intersection between a duration provided by the higher layer parameter and DRX active time, or an intersection between the duration provided by the higher layer parameter and DRX active time indicated by a drx-onDurationTimer and/or a drx-InactivityTimer.

In some embodiments, the monitoring module 42 stops monitoring the PDCCHs corresponding to the PCell, the PSCell, or the SCell during the second duration; the monitoring module 42 stops monitoring the PDCCHs corresponding to the PCell, the PSCell, or the SCell during an intersection between the second duration and the DRX active time; or the monitoring module 42 stops monitoring the PDCCHs corresponding to the PCell, the PSCell, or the SCell during an intersection between the second duration and DRX active time indicated by the drx-onDurationTimer and/or the drx-InactivityTimer.

Specifically, the monitoring module 42 switches to a dormant BWP for the PCell, the PSCell, or the SCell during the second duration; the monitoring module 42 uses the dormant BWP as an active BWP for the PCell, the PSCell, or the SCell during the second duration; the monitoring module 42 switches to the dormant BWP for the PCell, the PSCell, or the SCell during the intersection between the second duration and the DRX active time; the monitoring module 42 uses the dormant BWP as the active BWP for the PCell, the PSCell, or the SCell during the intersection between the second duration and the DRX active time; the monitoring module 42 switches to the dormant BWP for the PCell, the PSCell, or the SCell during the intersection between the second duration and DRX active time indicated by the drx-onDurationTimer and/or the drx-InactivityTimer; or the monitoring module 42 uses the dormant BWP as the active BWP for the PCell, the PSCell, or the SCell during the intersection between the second duration and the DRX active time indicated by the drx-onDurationTimer and/or the drx-InactivityTimer.

In the system for controlling PDCCH monitoring in above embodiments, in operation, by configuring the second duration for stopping PDCCH monitoring within the DRX active time, the duration for reducing monitoring the PDCCHs on the PCell/PSCell within the DRX active time can be adjusted more flexibly according to actual situations. In addition, PDCCH monitoring on the PCell/PSCell can be reduced only during the second duration within the current DRX active time, which can not only save power, but also ensure that normal PDCCH monitoring can be quickly restored in subsequent DRX cycles.

Figure 9:
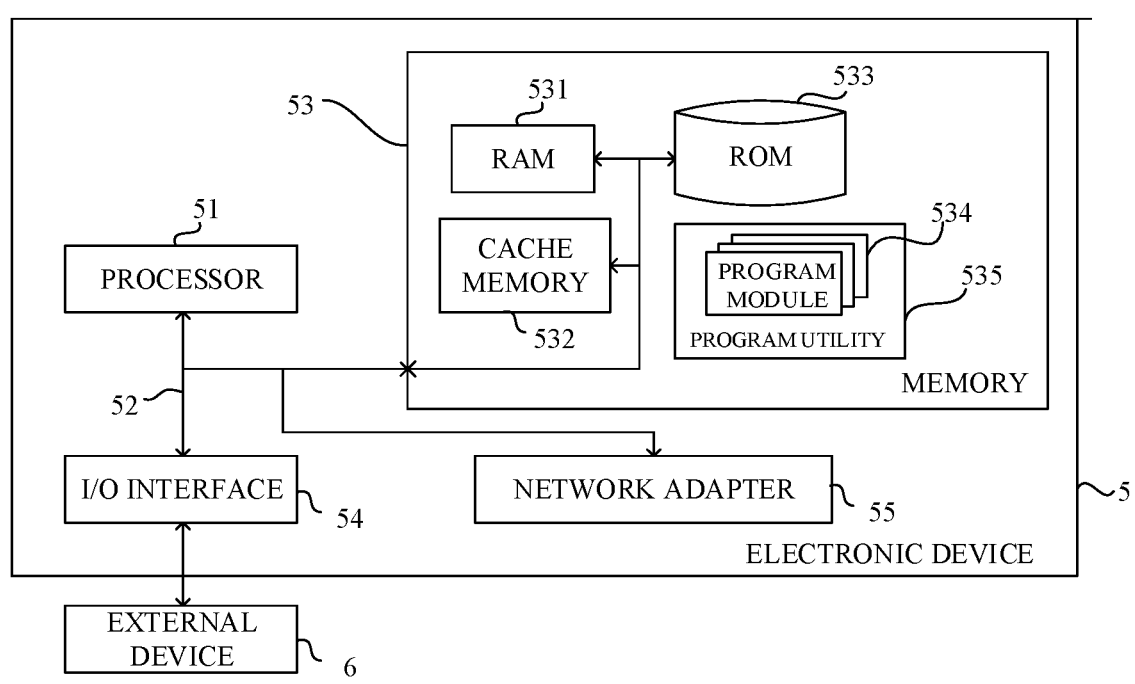
FIG. 9 is a structural block diagram of an electronic device in embodiments of the disclosure.

The present disclosure also provides an electronic device. As illustrated in FIG. 9, the electronic device may include a memory, a processor, and a computer program stored in the memory and executable on the processor. When the processor executes the computer program, the processor implements the method for controlling PDCCH monitoring described in any of the foregoing embodiments 1 to 4.

It can be understood that the electronic device 5 illustrated in FIG. 9 is only an example, and should not impose any limitation on the function and scope of use of the embodiments of the present disclosure.

As shown in FIG. 9, the electronic device 5 may take the form of a general-purpose computing device, for example, a server device. Components of the electronic device 5 may include, but are not limited to, at least one processor 51, at least one memory 53, and a bus 52 connecting different system components (including the memory 53 and the processor 51).

The bus 52 may include a data bus, an address bus, and a control bus.

The memory 53 may include a volatile memory, such as random access memory (RAM) 531 and/or cache memory 532, and further include read-only memory (ROM) 533.

The memory 53 may also include a program/utility 535 having a set (at least one) of program modules 534 including, but not limited to, an operating system, one or more application programs, other program modules and program data, where an implementation of a network environment may be included in each or some combination of the above examples.

The processor 51 executes various functional applications and data processing, for example, the method for controlling PDCCH monitoring in Embodiments 1 to 4 of the present disclosure, by running the computer program stored in the memory 53.

The electronic device 5 may also communicate with one or more external devices 6 (e.g., keyboards, pointing devices, etc.). Such communication may take place through input/output (I/O) interface 54. Also, the model-generating device 5 may also communicate with one or more networks (e.g., a local area network (LAN), a wide area network (WAN), and/or a public network) through a network adapter 55.

As shown in FIG. 9, the network adapter 55 may communicate with other modules of the model-generating device 5 via the bus 52. It should be understood that, although not shown, other hardware and/or software modules may be used in conjunction with the model-generating device 5, including but not limited to: microcode, device drivers, redundant processors, external disk drive arrays, RAID (disk arrays) systems, tape drives, and data backup storage systems.

It should be noted that although several units/modules or sub-units/modules of the electronic device are mentioned in the above detailed description, this division is merely exemplary and not mandatory. Indeed, the features and functions of two or more units/modules described above may be embodied in one unit/module according to embodiments of the present disclosure. Conversely, the features and functions of one unit/module described above may be further subdivided to be embodied by multiple units/modules.

Embodiments of the disclosure provides a computer-readable storage medium on which a computer program is stored, and when the program is executed by a processor, the method for controlling PDCCH monitoring in any of Embodiments 1 to 4 is implemented.

More specifically, the computer-readable storage medium may include, but is not limited to, portable disk, hard disk, random access memory, read-only memory, erasable programmable read-only memory, optical storage device, magnetic storage device, or any suitable combination of the above.

In a possible implementation, the present disclosure can also be implemented in the form of a program product, which includes program codes. When the program product runs on a terminal device, the program codes are configured to make the terminal device execute the method for controlling PDCCH monitoring in any of Embodiments 1 to 4.

Program codes for carrying out the present disclosure may be written in any combination of one or more programming languages, and the program codes may execute entirely on the UE, partially on the UE, as a stand-alone software package, partly on the UE and partly on the remote device, or entirely on the remote device.

Although the specific embodiments of the present disclosure are described above, those skilled in the art should understand that this is only an illustration, and the protection scope of the present disclosure is defined by the appended claims. Those skilled in the art can make various changes or modifications to these embodiments without departing from the principle and essence of the present disclosure, but these changes and modifications all fall within the protection scope of the present disclosure.

The disclosure is intended to solve the technical problem in the prior art that reducing PDCCH monitoring corresponding to the SCell and reducing PDCCH monitoring corresponding to the PCell, the PSCell, or the SCell cannot be indicated simultaneously, and provides a method and system for controlling PDCCH monitoring, a medium, and an electronic device.

The technical problem is solved by the following technical solutions in the disclosure.

A method for controlling physical downlink control channel (PDCCH) monitoring includes: acquiring first signaling; and determining, according to the first signaling, whether a secondary cell (SCell) is in a dormant state or a non-dormant state.

Optionally, the first signaling is a bitmap.

Optionally, the bitmap has N bits, N being an integer.

Optionally, the method further includes: acquiring second signaling; and determining, according to the second signaling, whether to stop monitoring PDCCHs corresponding to a primary cell (PCell), a primary secondary cell (PSCell), or the SCell.

Optionally, the second signaling is a bit in the bitmap.

Optionally, determine to stop monitoring the PDCCHs corresponding to the PCell, the PSCell, or the SCell, if the bit in the bitmap is "0"; or determine to monitor the PDCCHs corresponding to the PCell, the PSCell, or the SCell, if the bit in the bitmap is "1".

Optionally, a position of the bit in the bitmap is provided by a higher layer parameter.

Optionally, determining to stop monitoring the PDCCHs corresponding to the PCell, the PSCell, or the SCell, if the bitmap has bits in a first preset pattern.

Optionally, the first preset pattern is provided by a higher layer parameter.

Optionally, determine to stop monitoring the PDCCHs corresponding to the PCell, the PSCell, or the SCell, if all bits in the bitmap are "0"; or determine to monitor the PDCCHs corresponding to the PCell, the PSCell, or the SCell, if all bits in the bitmap are "1".

Optionally, stopping monitoring the PDCCHs corresponding to the PCell, the PSCell, or the SCell includes stopping a drx-onDurationTimer (on duration timer) and/or a drx-InactivityTimer (inactivity timer).

Optionally, stopping monitoring the PDCCHs corresponding to the PCell, the PSCell, or the SCell includes at least one of: stopping monitoring the PDCCHs corresponding to the PCell, the PSCell, or the SCell during DRX active time; or stopping monitoring the PDCCHs corresponding to the PCell, the PSCell, or the SCell during DRX active time indicated by the drx-onDurationTimer and/or the drx-InactivityTimer.

Optionally, stopping monitoring the PDCCHs corresponding to the PCell, the PSCell, or the SCell includes at least one of: switching to a dormant BWP for the PCell, the PSCell, or the SCell during DRX active time; using the dormant BWP as an active BWP for the PCell, the PSCell, or the SCell during the DRX active time; switching to the dormant BWP for the PCell, the PSCell, or the SCell during DRX active time indicated by the drx-onDurationTimer and/or the drx-InactivityTimer; or using the dormant BWP as the active BWP for the PCell, the PSCell, or the SCell during the DRX active time indicated by the drx-onDurationTimer and/or the drx-InactivityTimer.

Optionally, the method further includes: acquiring third signaling; determining, according to the third signaling, whether to stop monitoring PDCCHs corresponding to a PCell, a PSCell, or the SCell; and determining a first duration according to the third signaling, if determining to stop monitoring the PDCCHs corresponding to the PCell, the PSCell, or the SCell.

Optionally, the third signaling is one or more bits in the bitmap.

Optionally, determine to stop monitoring the PDCCHs corresponding to the PCell, the PSCell, or the SCell, if the third signaling is in a second preset pattern.

Optionally, the first duration is determined according to the third signaling.

Optionally, the third signaling corresponds to a first duration.

Optionally, a correspondence between the first duration and the third signaling is provided by a higher layer parameter.

Optionally, the first duration is an intersection between a duration provided by the higher layer parameter and DRX active time, or an intersection between the duration provided by the higher layer parameter and DRX active time indicated by a drx-onDurationTimer and/or a drx-InactivityTimer.

Optionally, stopping monitoring the PDCCHs corresponding to the PCell, the PSCell, or the SCell includes at least one of: stopping monitoring the PDCCHs corresponding to the PCell, the PSCell, or the SCell during the first duration; stopping monitoring the PDCCHs corresponding to the PCell, the PSCell, or the SCell during an intersection between the first duration and DRX active time; or stopping monitoring the PDCCHs corresponding to the PCell, the PSCell, or the SCell during an intersection between the first duration and DRX active time indicated by a drx-onDurationTimer and/or a drx-InactivityTimer.

Optionally, stopping monitoring the PDCCHs corresponding to the PCell, the PSCell, or the SCell includes at least one of: switching to a dormant BWP for the PCell, the PSCell, or the SCell during the first duration; using the dormant BWP as an active BWP for the PCell, the PSCell, or the SCell during the first duration; switching to the dormant BWP for the PCell, the PSCell, or the SCell during an intersection between the first duration and DRX active time; using the dormant BWP as the active BWP for the PCell, the PSCell, or the SCell during the intersection between the first duration and the DRX active time; switching to the dormant BWP for the PCell, the PSCell, or the SCell during an intersection between the first duration and DRX active time indicated by a drx-onDurationTimer and/or a drx-InactivityTimer; or using the dormant BWP as the active BWP for the PCell, the PSCell, or the SCell during the intersection between the first duration and the DRX active time indicated by the drx-onDurationTimer and/or the drx-InactivityTimer.

Optionally, the method further includes: acquiring fourth signaling; determining, according to the fourth signaling, whether to stop monitoring PDCCHs corresponding to a PCell, a PSCell, or the SCell; acquiring fifth signaling if determining to stop monitoring the PDCCHs corresponding to the PCell, the PSCell, or the SCell; and determining a second duration according to the fifth signaling.

Optionally, the fourth signaling is one or more bits in the bitmap.

Optionally, determine to stop monitoring the PDCCHs corresponding to the PCell, the PSCell, or the SCell, if the fourth signaling is value "0"; or determine to monitor the PDCCHs corresponding to the PCell, the PSCell, or the SCell, if the fourth signaling is value "1".

Optionally, the second duration is determined according to the fifth signaling.

Optionally, the fifth signaling corresponds to the second duration.

Optionally, a correspondence between the second duration and the fifth signaling is provided by a higher layer parameter.

Optionally, the second duration is an intersection between a duration provided by a higher layer parameter and DRX active time, or an intersection between the duration provided by the higher layer parameter and DRX active time indicated by a drx-onDurationTimer and/or a drx-InactivityTimer.

Optionally, stopping monitoring the PDCCHs corresponding to the PCell, the PSCell, or the SCell includes at least one of: stopping monitoring the PDCCHs corresponding to the PCell, the PSCell, or the SCell during the second duration; stopping monitoring the PDCCHs corresponding to the PCell, the PSCell, or the SCell during an intersection between the second duration and DRX active time; or stopping monitoring the PDCCHs corresponding to the PCell, the PSCell, or the SCell during an intersection between the second duration and DRX active time indicated by a drx-onDurationTimer and/or a drx-InactivityTimer.

Optionally, stopping monitoring the PDCCHs corresponding to the PCell, the PSCell, or the SCell includes at least one of: stopping monitoring the PDCCHs corresponding to the PCell, the PSCell, or the SCell during an intersection between the second duration and DRX active time indicated by a drx-onDurationTimer and/or a drx-InactivityTimer; switching to a dormant BWP for the PCell, the PSCell, or the SCell during the second duration; using the dormant BWP as an active BWP for the PCell, the PSCell, or the SCell during the second duration; switching to the dormant BWP for the PCell, the PSCell, or the SCell during an intersection between the second duration and DRX active time; or using the dormant BWP as the active BWP for the PCell, the PSCell, or the SCell during an intersection between the second duration and DRX active time indicated by the drx-onDurationTimer and/or the drx-InactivityTimer.

A system for controlling PDCCH monitoring is configured to implement the method for controlling PDCCH monitoring described above.

An electronic device includes a memory, a processor, and a computer program stored in the memory and executable on the processor, the processor is configured to execute the computer program to implement the method for controlling PDCCH monitoring described above.

A computer-readable storage medium storing a computer program which, when executed by a processor, causes the processor to implement the method for controlling PDCCH monitoring described above.

On the basis of conforming to common knowledge in the art, the above preferred conditions can be combined arbitrarily to acquire preferred examples of the present disclosure.

The disclosure has at least the advantages that, in the method and system for controlling PDCCH monitoring, the medium, and the electronic device provided in the disclosure, a bit(s) originally indicating SCell dormancy or SCell non-dormancy is reused to indicate whether to monitor the PDCCHs corresponding to the PCell, the PSCell, or the SCell, which can not only reduce signaling overhead but also achieve power saving of the UE.

Further, by stopping monitoring the PDCCHs corresponding to the PCell and the PSCell during the DRX active time, PDCCH monitoring on the PCell/PSCell can be reduced only during current DRX active time, which can not only save power, but also ensure that normal PDCCH monitoring can be quickly restored in subsequent DRX cycles.

Furthermore, by configuring the duration for stopping PDCCH monitoring within the DRX active time, the duration for reducing monitoring the PDCCHs on the PCell/PSCell within the DRX active time can be adjusted adaptively as needed.

What is claimed is:

1. A method for controlling physical downlink control channel (PDCCH) monitoring, comprising:
acquiring first signaling, wherein the first signaling is a bitmap having N bit, N being a positive integer;
determining whether a secondary cell (SCell) is in a dormant state or a non-dormant state according to the first signaling;
acquiring third signaling, wherein the third signaling is one or more bits in the bitmap;

determining whether to stop monitoring PDCCHs corresponding to a primary cell (PCell) or a primary secondary cell (PSCell) according to the third signaling;
determining to stop monitoring the PDCCHs corresponding to the PCell or the PSCell, if the third signaling is in a second preset pattern; and
determining a first duration according to the third signaling, if determining to stop monitoring the PDCCHs corresponding to the PCell or the PSCell.

2. The method of claim 1, further comprising:
acquiring second signaling; and
determining whether to stop monitoring the PDCCHs corresponding to the PCell or the PSCell according to the second signaling.

3. The method of claim 2, wherein the second signaling is a bit in the bitmap, and determining whether to stop monitoring the PDCCHs corresponding to the PCell or the PSCell according to the second signaling comprises:
determining to stop monitoring the PDCCHs corresponding to the PCell or the PSCell, if the bit in the bitmap is "0"; or
determining to monitor the PDCCHs corresponding to the PCell or the PSCell, if the bit in the bitmap is "1".

4. The method of claim 2, further comprising:
determining to stop monitoring the PDCCHs corresponding to the PCell or the PSCell, if all bits in the bitmap are "0"; or
determining to monitor the PDCCHs corresponding to the PCell or the PSCell, if all bits in the bitmap are "1".

5. The method of claim 2, wherein stopping monitoring the PDCCHs corresponding to the PCell or the PSCell comprises:
stopping at least one of a drx-onDurationTimer or a drx-InactivityTimer.

6. The method of claim 2, wherein stopping monitoring the PDCCHs corresponding to the PCell or the PSCell comprises at least one of:
stopping monitoring the PDCCHs corresponding to the PCell or the PSCell during DRX active time; or
stopping monitoring the PDCCHs corresponding to the PCell or the PSCell during DRX active time indicated by at least one of a drx-onDurationTimer or a drx-InactivityTimer.

7. The method of claim 2, wherein stopping monitoring the PDCCHs corresponding to the PCell or the PSCell comprises at least one of:
switching to a dormant BWP for the PCell or the PSCell during DRX active time;
using a dormant BWP as an active BWP for the PCell or the PSCell during DRX active time;
switching to a dormant BWP for the PCell or the PSCell during DRX active time indicated by at least one of a drx-onDurationTimer or a drx-InactivityTimer; or
using a dormant BWP as an active BWP for the PCell or the PSCell during DRX active time indicated by at least one of a drx-onDurationTimer a drx-InactivityTimer.

8. The method of claim 1, wherein the first duration is an intersection between a duration provided by a higher layer parameter and DRX active time, or an intersection between a duration provided by a higher layer parameter and DRX active time indicated by at least one of a drx-onDurationTimer or a drx-InactivityTimer.

9. The method of claim 1, wherein stopping monitoring the PDCCHs corresponding to the PCell or the PSCell comprises at least one of:
stopping monitoring the PDCCHs corresponding to the PCell or the PSCell during the first duration;

stopping monitoring the PDCCHs corresponding to the PCell or the PSCell during an intersection between the first duration and DRX active time;

stopping monitoring the PDCCHs corresponding to the PCell or the PSCell during an intersection between the first duration and DRX active time indicated by at least one of a drx-onDurationTimer or a drx-Inactivity-Timer;

switching to a dormant BWP for the PCell or the PSCell during the first duration;

using a dormant BWP as an active BWP for the PCell or the PSCell during the first duration;

switching to a dormant BWP for the PCell or the PSCell during an intersection between the first duration and DRX active time;

using a dormant BWP as an active BWP for the PCell or the PSCell during the intersection between the first duration and DRX active time;

switching to a dormant BWP for the PCell or the PSCell during an intersection between the first duration and DRX active time indicated by at least one of a drx-onDurationTimer or a drx-InactivityTimer; or using a dormant BWP as an active BWP for the PCell or the PSCell during the intersection between the first duration and DRX active time indicated by at least one of a drx-onDurationTimer or a drx-InactivityTimer.

10. The method of claim 1, further comprising:

acquiring fourth signaling;

determining whether to stop monitoring PDCCHs corresponding to the PCell, or the PSCell according to the fourth signaling;

acquiring fifth signaling if determining to stop monitoring the PDCCHs corresponding to the PCell or the PSCell; and determining a second duration according to the fifth signaling.

11. The method of claim 10, wherein the fourth signaling is one or more bits in the bitmap.

12. The method of claim 10, wherein determining whether to stop monitoring the PDCCHs corresponding to the PCell or the PSCell according to the fourth signaling comprises:

determining to stop monitoring the PDCCHs corresponding to the PCell or the PSCell, if the fourth signaling is value "0"; or determining to monitor the PDCCHs corresponding to the PCell or the PSCell, if the fourth signaling is value "1".

13. The method of claim 10, wherein the second duration is an intersection between a duration provided by a higher layer parameter and DRX active time, or an intersection between a duration provided by a higher layer parameter and DRX active time indicated by at least one of a drx-onDurationTimer or a drx-InactivityTimer.

14. The method of claim 10, wherein stopping monitoring the PDCCHs corresponding to the PCell or the PSCell comprises at least one of:

stopping monitoring the PDCCHs corresponding to the PCell or the PSCell during the second duration;

stopping monitoring the PDCCHs corresponding to the PCell or the PSCell during an intersection between the second duration and DRX active time;

stopping monitoring the PDCCHs corresponding to the PCell or the PSCell during an intersection between the second duration and DRX active time indicated by at least one of a drx-onDurationTimer or a drx-InactivityTimer;

stopping monitoring the PDCCHs corresponding to the PCell or the PSCell during an intersection between the second duration and DRX active time indicated by at least one of a drx-onDurationTimer or a drx-InactivityTimer;

switching to a dormant BWP for the PCell or the PSCell during the second duration;

using a dormant BWP as an active BWP for the PCell or the PSCell during the second duration;

switching to a dormant BWP for the PCell or the SCell or the PSCell during an intersection between the second duration and DRX active time; or using a dormant BWP as an active BWP for the PCell or the PSCell during an intersection between the second duration and DRX active time indicated by at least one of a drx-onDurationTimer or a drx-InactivityTimer.

15. An electronic device, comprising a memory, a processor, and a computer program stored in the memory and executable on the processor, the processor being configured to execute the computer program to:

obtain first signaling, wherein the first signaling is a bitmap having N bit, N being a positive integer;

determine whether a secondary cell (SCell) is in a dormant state or a non-dormant state according to the first signaling;

acquire third signaling, wherein the third signaling is one or more bits in the bitmap;

determine whether to stop monitoring PDCCHs corresponding to a primary cell (PCell) or a primary secondary cell (PSCell) according to the third signaling;

determine to stop monitoring the PDCCHs corresponding to the PCell or the PSCell, if the third signaling is in a second preset pattern; and determine a first duration according to the third signaling, if determining to stop monitoring the PDCCHs corresponding to the PCell or the PSCell.

16. A non-transitory computer-readable storage medium storing a computer program which, when executed by a processor, causes the processor to:

obtain first signaling, wherein the first signaling is a bitmap having N bit, N being a positive integer;

determine whether a secondary cell (SCell) is in a dormant state or a non-dormant state according to the first signaling;

acquire third signaling, wherein the third signaling is one or more bits in the bitmap;

determine whether to stop monitoring PDCCHs corresponding to a primary cell (PCell) or a primary secondary cell (PSCell) according to the third signaling;

determine to stop monitoring the PDCCHs corresponding to the PCell or the PSCell, if the third signaling is in a second preset pattern; and determine a first duration according to the third signaling, if determining to stop monitoring the PDCCHs corresponding to the PCell or the PSCell.

* * * * *